United States Patent

Sakata et al.

[11] Patent Number: 6,065,707
[45] Date of Patent: May 23, 2000

[54] CABLE REEL INCLUDING A SOUND-ABSORBING MATERIAL AND METHOD FOR PRODUCING THE SOUND-ABSORBING MATERIAL FOR THE CABLE REEL

[75] Inventors: Tomoyuki Sakata, Nagoya; Tetsuya Iizuka; Shoichi Sugata, both of Yokkaichi, all of Japan

[73] Assignees: Sumitomo Wiring Systems, Ltd.; Harness System Technologies Research, Ltd.; Sumitomo Electric Industries, Ltd., all of Japan

[21] Appl. No.: 09/126,257

[22] Filed: Jul. 30, 1998

[30] Foreign Application Priority Data

Aug. 8, 1997 [JP] Japan ................................. 9-214911

[51] Int. Cl.⁷ .......................... B65H 75/34; H01R 39/02
[52] U.S. Cl. ............................................. 242/388; 439/15
[58] Field of Search ................................ 242/388, 398, 242/402; 384/908, 909, 300; 439/15, 164

[56] References Cited

U.S. PATENT DOCUMENTS

| | | | |
|---|---|---|---|
| 2,705,691 | 4/1955 | Panagrossi et al. | 384/909 |
| 2,809,130 | 10/1957 | Rappaport | 384/908 |
| 2,999,707 | 9/1961 | Kniepkamp et al. | 384/909 |
| 4,921,428 | 5/1990 | Sasaki et al. | 439/15 |
| 5,100,331 | 3/1992 | Banfelder | 439/15 |
| 5,588,854 | 12/1996 | Ikumi et al. | 439/164 |
| 5,655,919 | 8/1997 | Ishikawa et al. | 439/164 |
| 5,707,023 | 1/1998 | Ichikawa et al. | 242/388 |

FOREIGN PATENT DOCUMENTS

| | | |
|---|---|---|
| 4422788 | 1/1995 | Germany . |
| 104471 | 4/1996 | Japan . |

*Primary Examiner*—John M. Jillions
*Attorney, Agent, or Firm*—Jordan B. Bierman; Bierman, Muserlian and Lucas

[57] ABSTRACT

A cable reel includes a sound-absorbing material which can effectively attenuate both sliding noise and vibration noise and can be produced inexpensively. The cable reel comprises a stationary member assembly and a movable member assembly rotatably mounted on the stationary member assembly. The stationary and movable member assemblies define a cable containing chamber having an annular configuration and upper and lower bearing surfaces. The cable containing chamber accommodates a flat cable in a coiled manner between the upper and lower bearing surfaces. Opposite ends of the flat cable are led out from the stationary and movable member assemblies through electrical means. The sound-absorbing material is made of a foam material and includes at least three straps. The straps extend radially and are equally spaced apart from each other in a circumferential direction on at least the lower bearing surface of the cable containing chamber so that the flat cable slides on the straps of the sound-absorbing material.

6 Claims, 5 Drawing Sheets

CABLE REEL INCLUDING A SOUND-ABSORBING MATERIAL AND METHOD FOR PRODUCING THE SOUND-ABSORBING MATERIAL FOR THE CABLE REEL

BACKGROUND OF THE INVENTION

This invention relates to a cable reel including a sound-absorbing material and a method for producing the sound-absorbing material for the cable reel, and more particularly it relates to a cable reel preferably adapted to be mounted on a steering device for an automotive vehicle so as to electrically interconnect a stationary member assembly and a movable member assembly through a flat cable and a method for producing a sound-absorbing material for use of the cable reel.

In an automotive vehicle equipped with an air bag, a cable reel is provided in a steering wheel in order to supply electrical power to an air bag system. For convenience of explanation, such a cable reel will be described below by referring to the drawings. FIG. 8 is a schematic longitudinal sectional view of a conventional cable reel.

FIGS. 9A to 9C show an example of a conventional sound-absorbing material. FIG. 9A is a plan view of a cable reel shown in FIG. 8, illustrating a conventional sound-absorbing material mounted on a bearing surface of the cable reel. FIG. 9B is a perspective view of the conventional sound-absorbing material. FIG. 9C is a fragmentary cross sectional view of the sound-absorbing material taken along line 9C—9C in FIG. 9A.

As shown in FIG. 8, the conventional cable reel includes a movable member assembly 1 which rotates together with a steering wheel, and a stationary member assembly 2 which is secured to a stationary shaft on a body frame. The movable and stationary member assemblies 1 and 2 define an annular cable containing chamber 3 which accommodates a flat cable 4 in a coiled manner. Opposite ends of the flat cable 4 in the coiled manner are connected to lead wires which are led out from the movable and stationary member assemblies 1 and 2, respectively, to be connected to an external connector or electrical wires. In such a cable reel, the flat cable 4 is wound in the cable containing chamber 3 when the steering wheel is turned in one or direction while the flat cable 4 is unwound in the chamber 3 when the steering wheel is turned in the other direction, so that a device (air bag) on the steering wheel is electrically connected to a power source on the body frame.

The cable reel involves a problem in that an unpleasant sliding noise is generated when the lateral opposite edges of the flat cable 4 slide on upper and lower bearing surfaces of the cable containing chamber 3 upon winding and unwinding of the flat cable 4 in the chamber 3. The flat cable 4 vibrates in an axial direction (from an upper to lower direction or from a lower to upper direction) of the steering wheel during idling or driving of the automotive vehicle, thereby giving rise to an unpleasant vibration noise due to collision between the bearing surfaces of the chamber 3 and the lateral opposite edges of the flat cable 4.

Japanese Utility Model Publication No. HEI 6-36040 (1994) discloses a cable reel in which a highly lubricative sheet such as a polytetrafluoroethylene (PTFE) resin or the like is adhered to at least one of bearing surfaces of a cable containing chamber in order to attenuate such a sliding noise. Also, Japanese Patent Public Disclosure No. HEI 8-104471 (1996) discloses a cable reel in which a sound-absorbing material 5 made of a resilient material such as a rubber or the like or a sound-absorbing material with the polytetrafluoroethylene (PTFE) resin is attached to bearing surfaces of stationary and movable member assemblies by means of clamps provided on the surfaces.

A polytetrafluoroethylene resin sheet is adhered by way of PET (polyethylene telephthalate) to a surface of a rubber sheet since the former lacks adhesion to the latter.

Although the polytetrafluoroethylene resin sheet disclosed in Japanese Utility Model Publication No. HEI 6-36040 (1994) can attenuate sliding noise on account of its high degree of lubrication, it cannot reduce noise which is caused by collision of the flat cable onto the bearing surfaces of the cable reel due to axial vibrations of the cable in a coiled manner. In particular, such unpleasant collision noise is likely to be accentuated when an engine is idling. On the other hand, the resilient sheet disclosed in Japanese Patent Publication No. HEI 8-104471 (1996) hardly attenuates sliding noise, since the lubrication between the flat cable and the resilient sheet is poor, although the sheet can reduce the collision or vibration noise.

The rubber sheet provided on its surface with a polytetrafluoroethylene resin sheet has a high lubrication due to the resin sheet, thereby reducing sliding noise and also can absorb vibration noise by means of the rubber sheet.

As shown in FIGS. 9A to 9C, however, a rubber sheet 5a, a polyethylene telephthalate (PET) film 5b and a polytetrafluoroethylene (PTFE) resin sheet 5c must be punched out into an annular shape adapted to be used, since the bearing surfaces of the cable containing chamber 3 are in an annular form. Consequently, this involves much loss of material. In particular, a total cost of the cable reel becomes high since the PTFE resin sheet is expensive.

In addition, the above sound-absorbing material 5 involves a high cost due to an increase in working steps, since the PET film is adhered to the rubber sheet through an adhesive and then the PTFE resin sheet is attached to the PET film by way of an adhesive.

Moreover, the above sound-absorbing material gives rise to a problem in that it reduces a sound-absorbing effect since the hard PET film is interposed between the rubber sheet having a sound-absorbing function and the PTFE resin sheet having a lubricative function. It is difficult to produce the PTFE resin sheet having a low thickness since it is produced by means of skiving. Consequently, the sheet on the market is usually more than 20 μm. Such a thick PTFE resin sheet in addition to the hard PET film will lower the sound-absorbing function.

SUMMARY OF THE INVENTION

An object of the present invention is to provide a cable reel including a sound-absorbing material which can effectively attenuate both sliding noise and vibration noise and can be produced inexpensively.

Another object of the present invention is to provide a method for producing a sound-absorbing material for a cable reel which can effectively attenuate both sliding noise and vibration noise and can be produced inexpensively.

In order to achieve the first object, a cable reel having a sound-absorbing material in accordance with the present invention comprises a stationary member assembly and a movable member assembly rotatably mounted on the stationary member assembly. The stationary and movable member assemblies define a cable containing chamber having an annular configuration and upper and lower bearing surfaces. The cable containing chamber accommodates a flat cable in a coiled manner between the upper and lower bearing surfaces. Opposite ends of the flat cable are led out from the stationary and movable member assemblies through electrical means. The sound-absorbing material is made of a foam material and includes at least three straps. The straps extend radially and are equally spaced apart from each other in a circumferential direction on at least the lower bearing surface of the cable containing chamber so that the flat cable slides on the straps of the sound-absorbing material.

The cable reel described above is attached to a steering device of an automotive vehicle to supply electrical power to an air bag system. When the movable member assembly which rotates with a steering wheel is turned to one direction, the flat cable is wound in the cable containing chamber in the cable reel while the flat cable is unwound when the assembly is turned in the other direction. The lateral opposite edges of the flat cable, in particular, the lateral lower edge which is subject to an empty weight, slide on the bearing surfaces of the cable containing chamber, in particular, the lower bearing surface during rotary motion. Since at least three straps of the sound-absorbing material made of a foam material are disposed radially on the bearing surface, the flat cable slides on the straps. That is, the straps of the sound-absorbing material are arranged on not an entire area of the bearing surface (as effected in the prior art) but an area of a part of the bearing surface. The contact area between the flat cable and the straps is reduced, thereby attenuating both sliding noise and vibration noise. Further, since the foam material is used as a sound-absorbing material, the foam material can perform a high sound-absorbing function rather than a rubber material which has been used in the prior art. In particular, even if the flat cable vibrates in the axial direction of the cable reel due to vibration of the engine during an idling mode or a driving mode and the lateral lower edge of the flat cable collides on the lower bearing surface of the cable containing chamber, the unpleasant vibration noise is absorbed by the foam material.

Each of the straps of the sound-absorbing material has a narrow width and extends radially from an inner peripheral edge of the bearing surface to an outer peripheral edge of the bearing surface. Each strap is provided on the top end with an arcuate surface to minimize a contact area between the flat cable and the strap. Such minimization of contact area can attenuate sliding noise and reduce contact wear of the flat cable.

Preferably, a highly lubricative agent is applied on a surface of each strap of the sound-absorbing material made of a foam material. Alternatively, each of the straps of the sound-absorbing material has a narrow width and extends radially from an inner peripheral edge of said bearing surface to an outer peripheral edge of the bearing surface. Each strap is provided in the top end with a groove extending longitudinally. A highly lubricative agent is filled in the groove in each strap over the top surface of the strap so that the flat cable slides on the highly lubricative agent. The highly lubricative agent may be a fluororesin system coating agent. Thus, the highly lubricative layer on the steps of the sound-absorbing material enhance sliding of the flat cable, thereby reducing sliding noise.

In the prior art, the polytetrafluoroethylene resin is formed into a sheet beforehand and the resin sheet is attached to the rubber sheet through the PET film, since it is difficult to directly adhere the resin sheet to the rubber sheet. However, in the sound-absorbing material of the present invention, a fluororesin system coating agent in a liquid form is mixed with the adhesive prior to being formed into a sheet or strap, and the mixture in a liquid form is applied directly onto the surface of the rubber sheet by means of a spray, a brush, or a roller, and then the coated layer is heated to a given temperature and hardened to form a very thin and highly lubricative coating layer on the rubber sheet.

When the fluororesin system coating agent is used as it is and the agent mixed with the adhesive is applied onto the foam material, the agent will get to fit on the foam material and thus it is possible to directly form the highly lubricative coating layer made of the fluororesin system coating agent on the foam material without using the PET. The application of the fluororesin system coating agent on the foam material makes the thickness of the coating layer less than that of the conventional resin sheet, and as PET is not used, the sound-absorbing function of the foam material can be enhanced, and an adhesion step for a PET film and a PTFE resin sheet can be eliminated, thereby reducing work processes.

Moreover, a coating area becomes small since the foam material is disposed on a part of the bearing surface. It is also possible to reduce an amount of the PTFE resin to be used and to lower a cost since the highly lubricative material layer is only 1 to 10 $\mu$m in thickness. In the prior art, the PTFE resin sheet having a thickness of more than 20 $\mu$m was cut into an annular shape and thus an amount of consumption of resin and cost were high.

The sound-absorbing material is made of a rubber system foam material or a resin system foam material. Preferably, the rubber system foam material is a foam styrene butadiene rubber (foam SBR) or the like while the resin system foam material is a foam polyurethane or the like.

The cable containing chamber is provided in the bearing surface with at least three redial dovetail grooves and each of the straps of the sound-absorbing material is provided in the bottom with a dovetail adapted to be fitted in the dovetail groove. This enhances joining between the sound-absorbing material and the bearing surface.

The present invention is also directed to a method for producing a sound-absorbing material for a cable reel which comprises a stationary member assembly and a movable member assembly rotatably mounted on the stationary member assembly. The stationary and movable member assemblies define a cable containing chamber having an annular configuration and upper and lower bearing surfaces. The cable containing chamber accommodates a flat cable in a coiled manner between the upper and lower bearing surfaces. Opposite ends of the flat cable are led out from the stationary and movable member assemblies through electrical means. The sound-absorbing material is disposed on at least the lower bearing surface of the cable containing chamber. The method comprises the steps of: applying a liquid rubber or resin mixed with a forming agent to given areas of the bearing surface; heating the liquid rubber or resin at a given temperature; and forming the rubber or resin to project the rubber or resin over the bearing surface, thereby forming the sound-absorbing material.

The rubber or resin is mixed with a foaming agent such as a resolutive foaming agent, a volatile foaming agent, or the like to form a liquid material having a desired viscosity, the liquid material is applied to given areas on the bearing surface, and the liquid material on the bearing surface is heated at a foaming temperature of the foaming agent to form the material to a desired configuration. Thus, the sound-absorbing material is produced. The heating process is carried out by flowing a warm air onto the liquid material on the bearing surface, or passing the liquid material through a heating furnace to maintain the foaming temperature.

Since the method of the present invention utilizes the steps of directly applying the foaming agent on the desired areas on the bearing surface, heating and foaming it, the method can eliminate the conventional steps of sticking a sound-absorbing sheet on the bearing surface, and punching a rubber material, a PET sheet, and a PTFE sheet, which constitute the sound-absorbing sheet, thereby substantially reducing the number of working steps. In addition, the method of the present invention causes no loss of a mother material, although the conventional method which includes the step of punching the sheet in an annular shape has caused a lot of loss of the mother material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENTS

Figure 8:
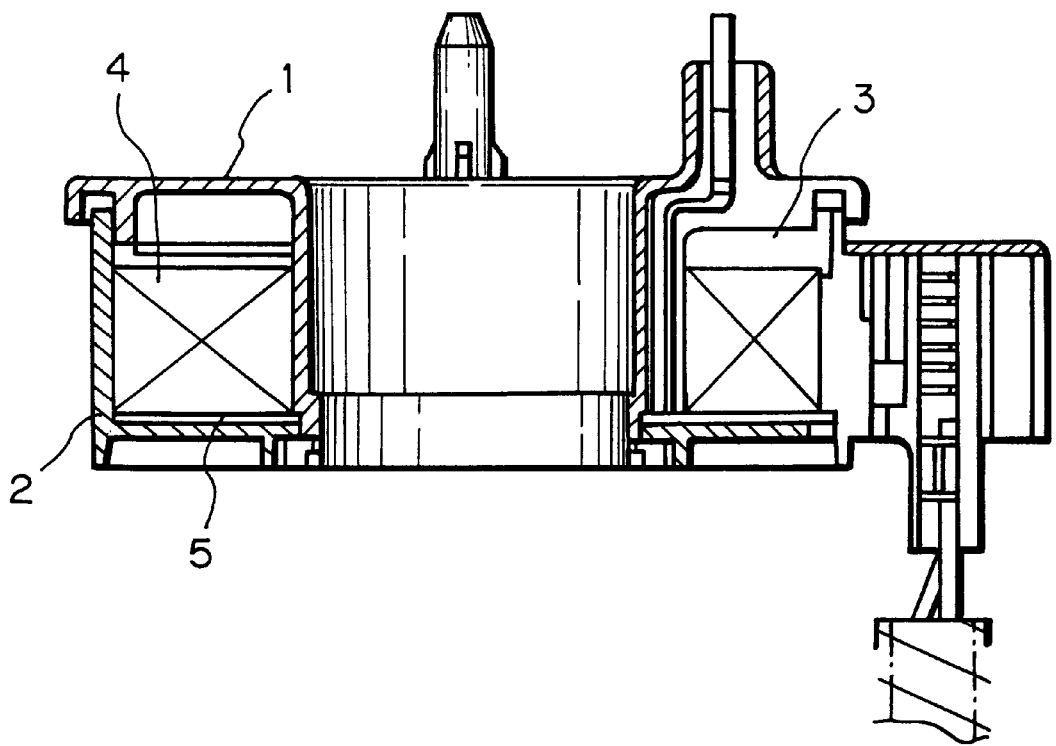
FIG. 8 is a schematic longitudinal sectional view of a conventional cable reel.
Figure 9A:
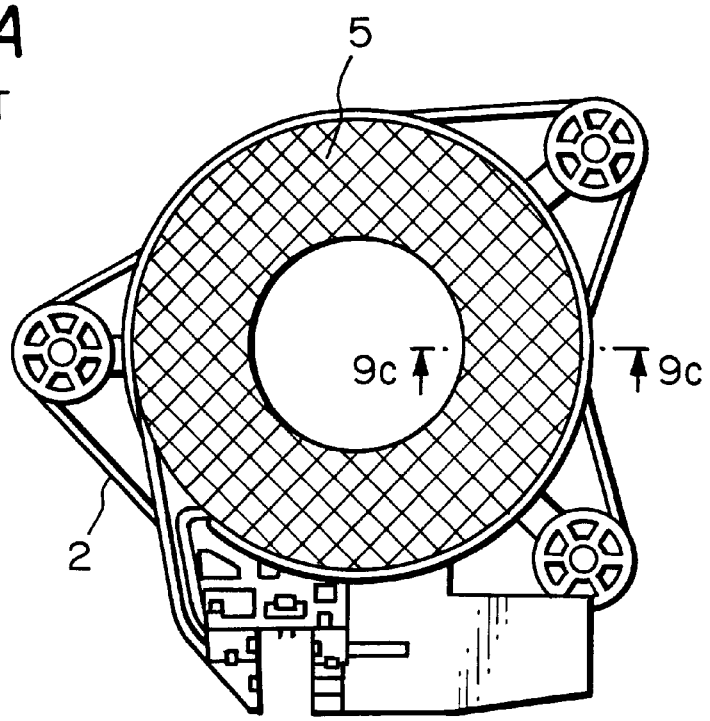
FIG. 9A is a plan view of the conventional cable reel, illustrating a bearing surface of the cable reel on which a conventional sound-absorbing material is mounted.
Figure 9B:
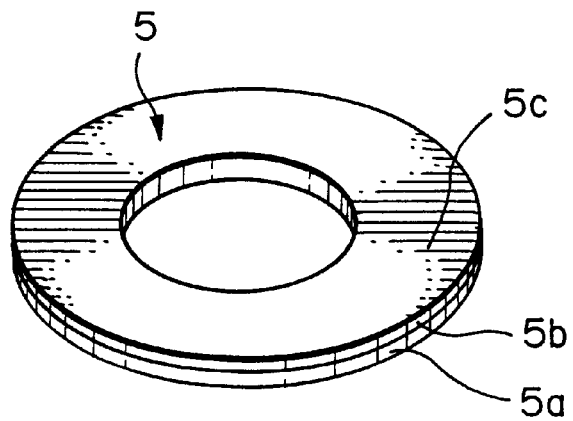
FIG. 9B is a perspective view of the conventional sound-absorbing material.
Figure 9C:
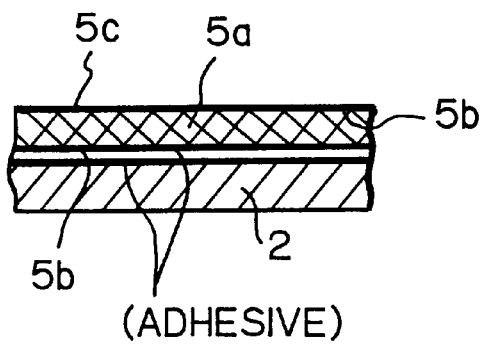
FIG. 9C is a fragmentary enlarged cross sectional view of the cable reel taken along line 9C—9C in FIG. 9A.

Embodiments of the present invention will be described below by referring to the drawings. The embodiments are directed to a cable reel which includes a sound-absorbing material and is mounted on a steering device in an automotive vehicle. A main body of the cable reel of the present invention has the same structure as that of the conventional cable reel shown in FIG. 8. In both structures, the same members are indicated by the same reference numbers.

The cable reel of the present invention includes a movable member assembly 10 which is secured to a steering wheel (not shown) to be turned together with it, and a stationary member assembly 11 which is secured to a shaft (not shown) fixed on a body frame. The movable member assembly 10 has an upper wall 10a and an inner peripheral wall 10b while the stationary member assembly 11 has a lower wall 11a and an outer peripheral wall 11b. The movable and stationary member assemblies 10 and 11 define an annular cable containing chamber 12. The cable containing chamber 12 accommodates a flat cable 15 in a coiled manner. An inner end of the flat cable 15 in a coiled manner is connected to a lead wire 13 which is led out through an attaching hole 10c in the upper wall 10a of the movable member assembly 10. An outer end of the flat cable 15 in a coiled manner is connected to a lead wire 14 which is led out from the stationary member assembly 11. The flat cable 15 is wound in the cable containing chamber 12 when the steering wheel is turned in one direction while the flat cable 15 is unwound in the chamber 12 when the steering wheel is turned in the other direction. Thus, the lead wires 13 and 14 are electrically coupled to each other through the flat cable 15, even if the steering wheel is turned to either direction.

Figure 1:
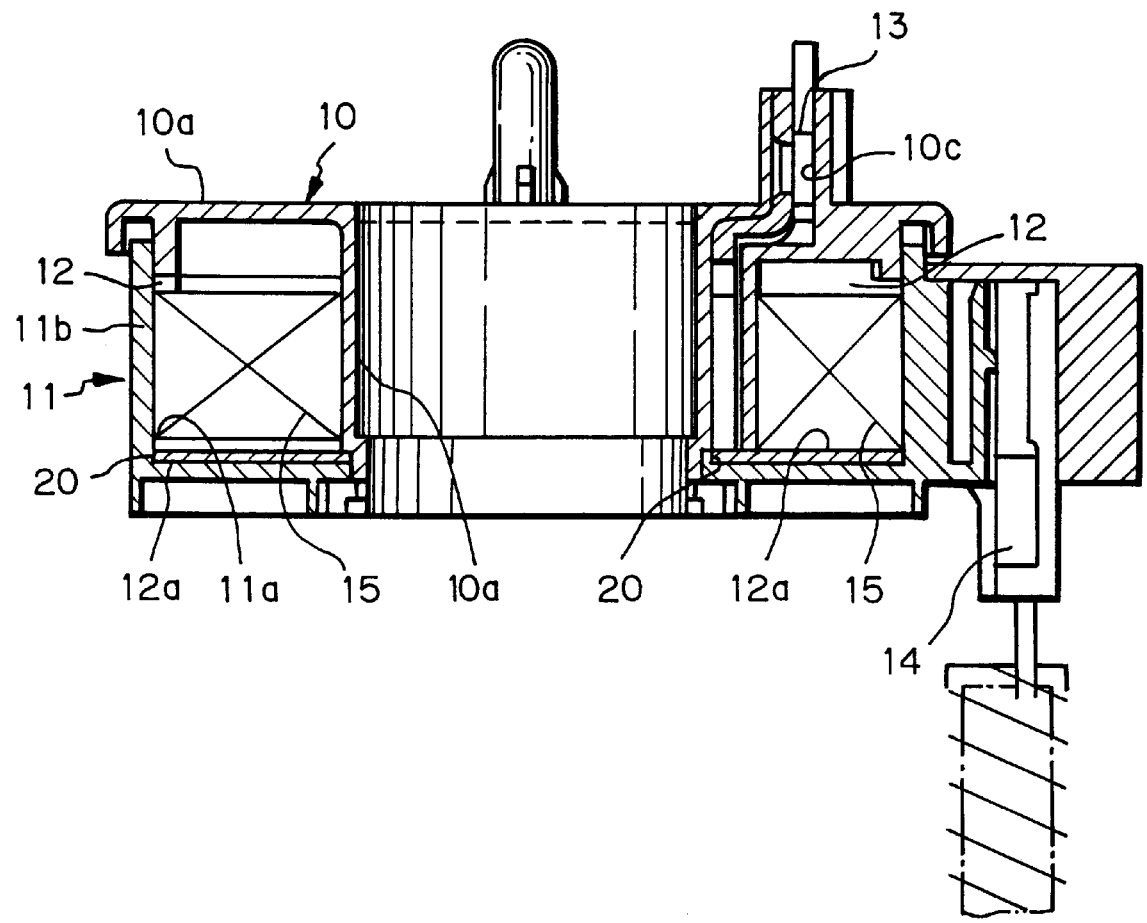
FIG. 1 is a schematic longitudinal sectional view of a cable reel in accordance with the present invention.
Figure 2:
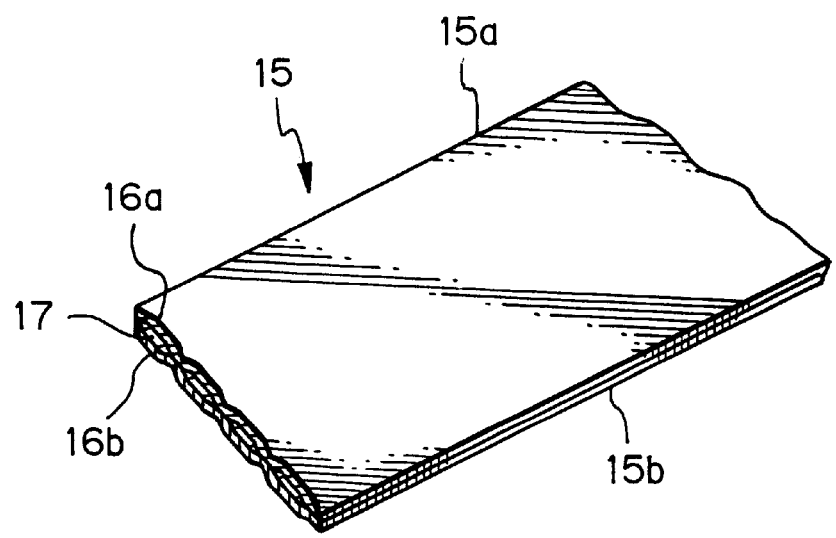
FIG. 2 is a schematic perspective view of a part of a flat cable to be accommodated in a cable containing chamber of the cable reel shown in FIG. 1.
Figure 3:
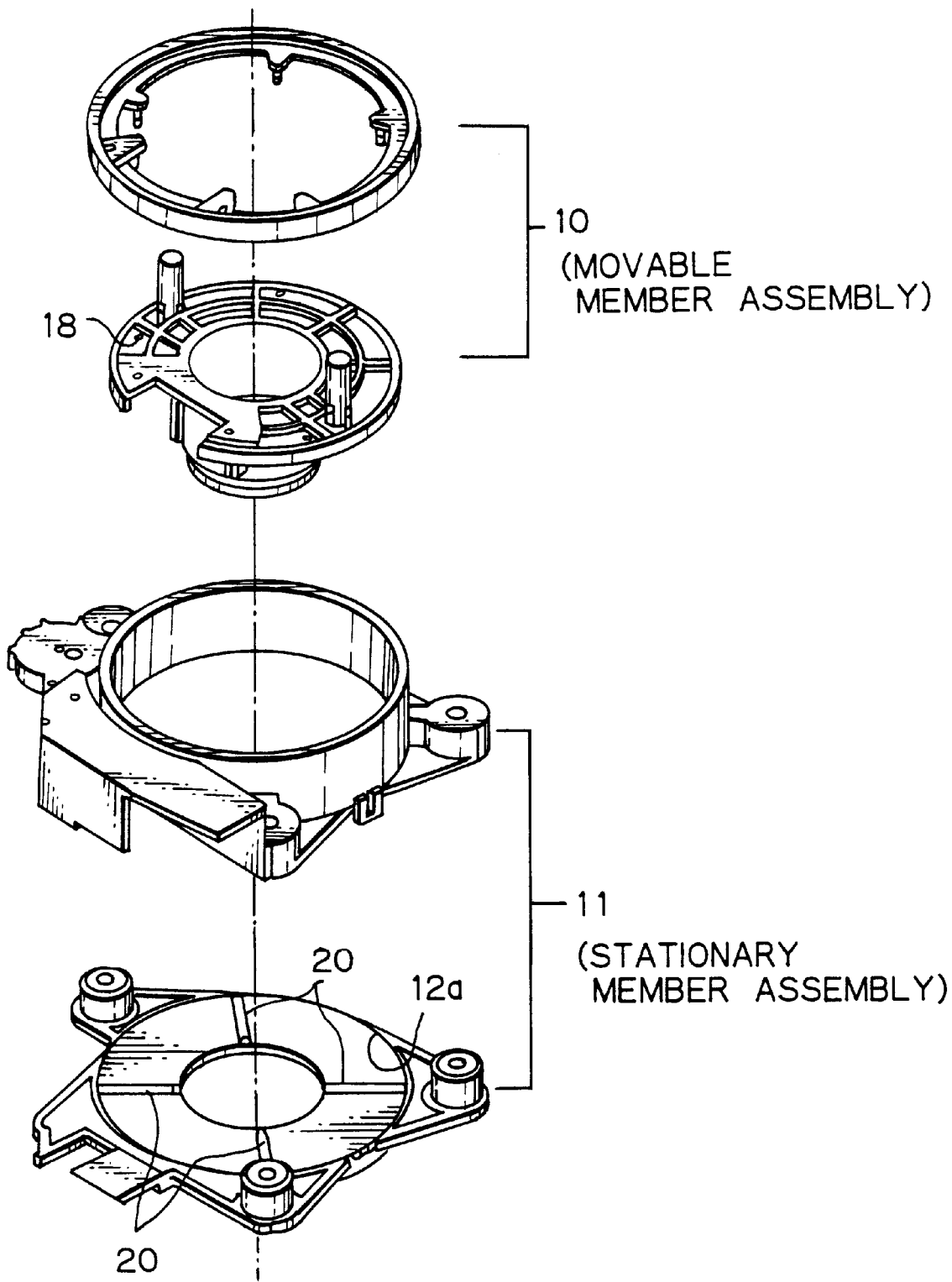
FIG. 3 is an exploded perspective view of the cable reel shown in FIG. 1, illustrating main elements constituting the cable reel.

The flat cable 15, as shown in FIG. 2, includes a pair of insulation resin films 16a and 16b, and a conductive material 17 interposed between the films 16a and 16b. The flat cable 15 is wound and unwound in the cable containing chamber 12 while either one of lateral opposite edges 15a and 15b of the flat cable 15 is sliding on a lower annular flat bearing surface 12a of the cable containing chamber 12. Accordingly, a sound-absorbing material 20 is mounted on the lower bearing surface 12a, as shown in FIG. 3.

On the other hand, the cable containing chamber 12 is provided on the upper wall with a plurality of elongate ribs 18 each of which extends radially and is spaced apart at a given distance in the circumferential direction. There is a slightly small clearance between the ribs 18 and the lateral upper edge 15a of the flat cable 15. Thus, no sliding noise is caused on the upper side in the cable containing chamber 12. The sound-absorbing material 20 may be mounted on the upper flat annular wall of the cable containing chamber 12 without providing the ribs 18 on the wall.

Figure 4A:
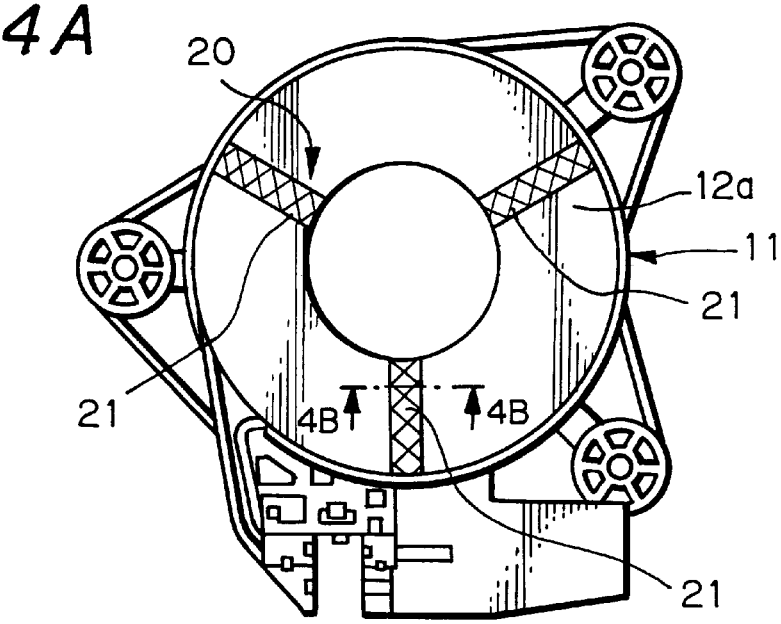
FIG. 4A is a plan view of the cable reel, illustrating a bearing surface of the cable reel on which a first embodiment of a sound-absorbing material is mounted.
Figure 4B:
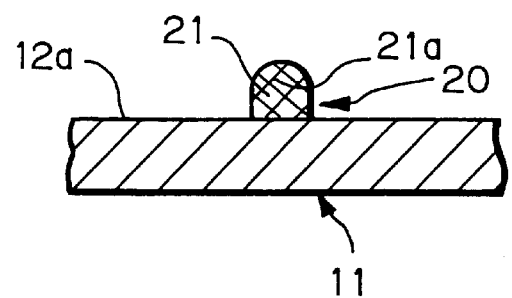
FIG. 4B is a fragmentary enlarged cross sectional view of the cable reel taken along line 4B—4B in FIG. 4A.

A first embodiment of the sound-absorbing material 20 in accordance with the present invention, as shown in FIGS. 4A and 4B, comprises at least three elongated straps 21 which extend radially and are spaced apart from each other by an angle of 120° in a circumferential direction on a bearing surface 12a of the lower wall 11a of the stationary member 11. Each strap 21 of the sound-absorbing material 20 has a thickness of 1 to 2 mm, preferably 1.3 mm in this embodiment. The three straps 21 spaced circumferentially by an angle of 120° bear a lateral lower edge of the flat cable 15 stably and slidably. It should be noted that an arrangement of the straps are not limited to three positions.

The sound-absorbing material 20 includes the straps 21 made of a foam rubber (foam SBR). Each strap 21 has an arcuate surface 21a on the top end so as to minimize a contact area between the strap 21 and the lateral lower edge of the flat cable 15.

The sound-absorbing material 20 is made of a SBR (styrene butadiene rubber) in a liquid form having a desired viscosity. The SBR is made by mixing a rubber material with a resolutive foaming agent such as an inorganic compound, an azo-compound, a sulfonyl hydrazide compound, or the like. The liquid SBR is applied onto the bearing surface in a given width to form three straps 21 each of which is spaced apart by an angle of 120° in a circumferential direction. The SBR is heated at a foaming temperature (for example, 150° C.) by a dryer which blows a hot air and then the foaming agent is resolved and foamed to form a strap 21 in a given shape.

The sound-absorbing material is not limited to the foam rubber and it may be a foam resin such as a foam urethane or the like. The material may be sprayed directly onto the given areas on the bearing surface in place of painting. The foam urethane is foamed at 100° C.

The lateral lower edge of the flat cable 15 slides on the arcuate surface of the straps 21 of the sound-absorbing material 20 on the bearing surface 12a. Upon sliding the edge of the flat cable comes into linear contact with the three straps spaced apart from each other by angle of 120°, thereby minimizing a contact area between the flat cable 15 and the sound-absorbing material 20. Consequently, sliding noise is reduced and thus a contact wear of the flat cable 15 is decreased. Moreover, the sound-absorbing material 20 having straps 21 made of the foam rubber performs a higher rate of absorbing vibration noise than a usual rubber material when a vertical vibration is generated. This also results in effective reduction of vibration noise.

Figure 5:
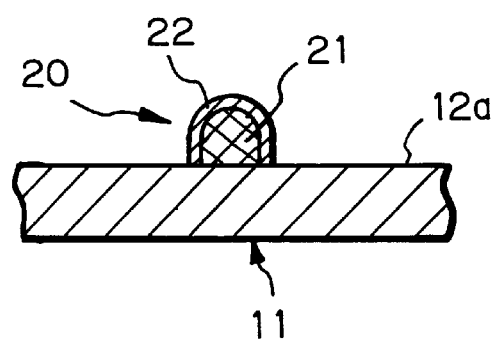
FIG. 5 is a similar view to FIG. 4B, illustrating a second embodiment of the sound-absorbing material.

FIG. 5 shows a second embodiment of the sound-absorbing material 20. In the second embodiment, the strap 21 made of the foam rubber in the first embodiment is covered with a highly lubricative coating layer 22 made of the PTFE resin and having a thickness of 3 μm. The PTFE resin is applied onto the straps 21 by means of spraying. After spraying, the sound-absorbing material 20 is heated at a given temperature to harden the highly lubricative coating layer 22 on the strap 21. Since the PTFE resin in a liquid form is mixed with a liquid adhesive, the highly lubricative coating layer 22 is securely adhered to the strap 21.

As described above, the highly lubricative coating layers 22 made of the PTFE resin on the straps 21 made of the foam rubber can attenuate sliding noise. Even if the flat cable vibrates in the axial direction of the cable reel due to vibration of the engine during an idling mode or a driving mode and the lateral lower edge of the flat cable collides on the lower bearing surface of the cable containing chamber, the unpleasant vibration noise is attenuated by the straps 21 and the sliding noise is attenuated by the highly lubricative coating layer. In particular, since the highly lubricative coating layer 22 on the rubber sheet is extremely thin (3 μm in thickness), the layer does not interfere with the sound-absorbing function of the straps 21. Consequently, vibration noise can be attenuated in the same manner as sliding noise.

Figure 6:
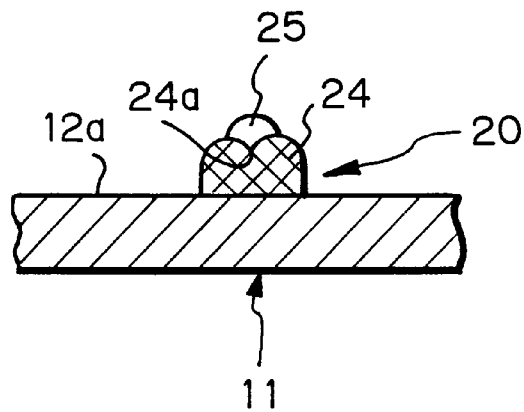
FIG. 6 is a similar view to FIG. 4B, illustrating a third embodiment of the sound-absorbing material.

FIG. 6 shows a third embodiment of the sound-absorbing material 20. The sound-absorbing material 20 includes at least three straps 24 made of a foam urethane. Each strap 24 is provided in the top and with a groove 24a extending longitudinally. A highly lubricative agent such as the PTFE resin is filled in the groove 24a over the top surface of the strap 24 so that a highly lubricative agent layer 25 is formed on the top of the strap 24. The layer 25 is harder than the strap 24 made of the foam rubber and has an arcuate surface.

The lateral lower edge of the flat cable 15 slides on the highly lubricative agent arcuate layer 25, thereby effectively attenuating sliding noise. Vibration noise is attenuated by the foam urethane strap 24.

The third embodiment can reduce an amount of the expensive PTFE resin to be used and lower a cost of the sound-absorbing material. Deformation of the foam urethane strap 24 becomes large since the PTFE resin does not cover the entire surface of the strap 24, thereby enhancing an absorbing function of both vibration noise and sliding noise.

Figure 7:
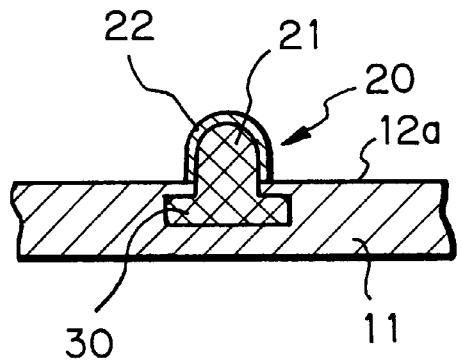
FIG. 7 is a similar view to FIG. 4B, illustrating a fourth embodiment of the sound-absorbing material.

FIG. 7 shows a fourth embodiment of the round-absorbing material 20. The sound-absorbing material 20 in this embodiment has at least three straps 21 made of the foam rubber and covered with the same highly lubricative coating layer 22 made of the PTFE resin as that of the second embodiment. In the fourth embodiment, at least three corresponding dovetail grooves 30 are formed in the bearing surface beforehand, a rubber mixed with a liquid foaming agent is filled in the grooves 30 and painted on given areas on the bearing surface 12a, around the grooves 30 and then the rubber is heated at a given temperature to form the straps 21. Thus, the sound-absorbing material 20 is positively secured to the bearing surface 12a.

It will be apparent from the foregoing that the sound-absorbing material of the present invention is superior to absorbability of sliding noise and vibration noise and in particular to attenuation of vibration noise since the sound-absorbing material is made of a foaming material such as a foam rubber or a foam resin.

It is also possible to minimize a contact area between the flat cable and the bearing surface since the sound-absorbing material is provided not on the entire area of the bearing surface but on a limited area of the bearing surface necessary to steadily support the flat cable, thereby attenuating sliding noise and reducing a contact wear of the flat cable.

Further, it is possible to make the highly lubricative coating layer very thin while maintaining lubrication of the flat cable and effective attenuation of sliding noise by forming the highly lubricative coating layer made of the fluororesin system coating agent such as a polytetrafluoroethylene resin or the like on the straps made of a foam material.

Also, it is possible to provide the sound-absorbing material on the bearing surface very easily by utilizing the method of the present invention rather than by a conventional method, since a liquid foam material is first painted on the bearing surface and then heated at a desired temperature to foam it. The method of the present invention does not require a conventional step for punching a sheet, can eliminate a loss of mother material, can simplify a process, and can achieve a great cost down.

From the above description of the invention, those skilled in the art will perceive improvements, changes and modifications. Such improvements, changes and modifications within the skill of the art are intended to be covered by the appended claims.

The entire disclosure of Japanese Patent Application No. 9-214911 (1997) filed on Aug. 8, 1997 including specification, claims, drawings and summary is incorporated herein by reference in its entirety.

What is claimed is:

1. A cable reel having a sound-absorbing material, comprising a stationary member assembly and a movable member assembly rotatably mounted on said stationary member assembly, said stationary and movable member assemblies defining a cable containing chamber having an annular configuration and upper and lower bearing surfaces, said cable containing chamber accommodating a flat cable in a coiled manner between said upper and lower bearing surfaces, opposite ends of said flat cable being led out from said stationary and movable member assemblies through electrical means;

characterized in that said sound-absorbing material is made of a foam material and includes at least three straps, and that said straps extend radially and are equally spaced apart from each other in a circumferential direction on at least said lower bearing surface of said cable containing chamber so that said flat cable slides on said straps of said sound-absorbing material;

each of said straps of said sound absorbing material has a narrow width and extends radially from an inner peripheral edge of said bearing surface to an outer peripheral edge of said bearing surface, wherein said each strap is provided in the top end with a groove extending longitudinally, and wherein a highly lubricative agent is filled in said groove in said each strap over the top surface of said strap so that the flat cable slides on said highly lubricative agent.

2. A cable reel having a sound-absorbing material according to claim 1, wherein said sound-absorbing material is made of a rubber system foam material or a resin system foam material.

3. A cable reel having a sound-absorbing material according to claim 1, wherein said highly lubricative agent is a fluororesin system coating agent.

4. A cable reel having a sound-absorbing material according to claim 1, wherein said cable containing chamber is provided in the bearing surface with at least three radial dovetail grooves and each of said straps of said sound-absorbing material is provided in the bottom with a dovetail adapted to be fitted in said dovetail groove.

5. A cable reel having a sound-absorbing material according to claim 2, wherein said cable containing chamber is provided in the bearing surface with at least three radial dovetail grooves and each of said straps of said sound-absorbing material is provided in the bottom with a dovetail adapted to be fitted in said dovetail groove.

6. A cable reel having a sound-absorbing material according to claim 3, wherein said cable containing chamber is provided in the bearing surface with at least three radial dovetail grooves and each of said straps of said sound-absorbing material is provided in the bottom with a dovetail adapted to be fitted in said dovetail groove.

* * * * *